United States Patent [19]
Reich et al.

[11] 3,984,940
[45] *Oct. 12, 1976

[54] DEGRADABLE PLASTIC

[76] Inventors: Murray Reich, 184 Loomis Court; Donald E. Hudgin, 33 Bushkin Junction, both of Princeton, N.J. 08540

[*] Notice: The portion of the term of this patent subsequent to June 3, 1992, has been disclaimed.

[22] Filed: Apr. 28, 1975

[21] Appl. No.: 572,588

Related U.S. Application Data

[63] Continuation of Ser. No. 358,222, May 8, 1973, abandoned.

[52] U.S. Cl. ................................... 47/9; 260/45.7 S
[51] Int. Cl.² ............................................ A01G 7/00
[58] Field of Search ................ 47/9, 58; 260/45.7, 260/45.7 S, DIG. 43

[56] References Cited
UNITED STATES PATENTS

| | | | |
|---|---|---|---|
| 3,299,568 | 1/1967 | Tobolsky et al. | 47/9 |
| 3,320,695 | 5/1967 | Moore | 47/9 |
| 3,454,510 | 7/1969 | Newland et al. | 47/9 X |
| 3,590,528 | 7/1971 | Shepherd | 47/9 |
| 3,592,792 | 7/1971 | Newland et al. | 47/9 X |
| 3,679,777 | 7/1972 | Lambert | 47/9 X |
| 3,795,654 | 3/1974 | Kirkpatrick | 47/9 X |
| 3,828,471 | 8/1974 | Anderson | 47/9 |
| 3,839,311 | 10/1974 | Guillory et al. | 47/9 X |
| 3,886,683 | 6/1975 | Hudgin et al. | 47/9 |
| 3,896,585 | 7/1975 | Miller et al. | 47/9 |

*Primary Examiner*—Robert E. Bagwill
*Attorney, Agent, or Firm*—Burgess, Dinklage & Sprung

[57] ABSTRACT

Films and containers are made from polymers of propylene such as polypropylene which contains a small amount of stabilizer whereby the rapid degradation rate of polypropylene can be controlled so that it will degrade after predetermined exposure to sunlight. This renders such products especially suited for agricultural mulch films, where they need not be removed after a growing season, and for throw-away containers where they will decompose in garbage dumps or if discarded as litter. The thermal history of the polymer will also affect its degradation rate.

The rate is measured in terms of thermally adjusted Langley units (TALU) since it has been found that the ambient temperature affects decomposition as well as the Langley units of solar radiation exposure.

2 Claims, No Drawings

DEGRADABLE PLASTIC

This is a continuation of application Ser. No. 358,222, filed May 8, 1973, now abandoned.

The present invention relates to shaped plastic structures which will degrade in predetermined time intervals.

A large proportion of the plastic products which are presently manufactured are intended to be used for relatively limited periods of time, after which the products are usually discarded or otherwise disposed of. Examples of such plastic articles are packaging films; all kinds of food containers such as egg cartons, meat trays, and bottles; beer can holders; containers for beverages such as milk, soft drinks, and beer; disposable clothing; drinking cups, plates, and plastic cutlery; agricultural mulch films; films used for construction purposes such as temporary windows, and films for curing concrete; bottles; containers for detergents and other cleaning agents; containers for motor oils; garbage and litter bags; laundry bags; disposable clothing and diaper liners; disposable baby bottles, cosmetic and pharmaceutical containers; and many others.

In addition, other plastic-containing articles, although intended for more durable uses, are often discarded because of wear and tear, obsolescence, styling changes, or owners becoming tired of them. Such articles include toys, clothing, fabrics, furniture, appliances and automobiles.

In the last decade plastics usage has grown phenomenally, and this growth will undoubtedly continue unabated.

An unhappy side effect of the explosive growth of plastics usage is to aggravate the problem of disposing of solid waste materials in general, and the accumulation of solid wastes over recent years has resulted in severe environmental pollution.

A costly aspect of solid wastes disposal is collection and transportation to the disposal area. Solid wastes are collected on a regular basis in plastic bags, cans, containers, and are picked up as litter on streets, highways, rivers, parks, etc. It is more costly to collect litter than solid waste in a container.

Another expensive aspect of solid waste removal is disposing of the refuse and wastes after they are collected. According to the Federal Bureau of Solid Waste Management, the disposal costs run several times the cost of collection.

The usual method of solid waste disposal is by landfill, which accommodates over 90% of the country's solid waste at about 12,000 landfill sites. The Bureau of Solid Waste Management states that this seemingly simple disposal method presents formidable problems, such as the evolution of noxious gases from some wastes, the leaching of some wastes by ground waters, and continued settling of the fill if it is not properly compacted.

Another serious restriction to the use of landfill as a disposal method is the aversion of the public to the use of land to dispose of waste in their own communities.

Another major method of solid waste disposal is incineration. There have been several recent development in incineration technology including a rotary kiln incinerator which requires that the wastes are classified into those that can be fed to the kiln directly (trash and scrap plastic), pumpable wastes and miscellaneous liquid wastes. However, it was necessary to develop separate feed systems for each category.

Another more serious problem facing state and municipal governments using incinerators is the increased stringency of air pollution control regulations which restrict the amount and the type of air pollutants the incinerator can exhaust to the atmosphere, and require that the incinerator be maintained at high burning efficiency.

Landfill and incineration constitute the two major methods of solid waste. However, a third method of disposal is to transport solid wastes by barge to the ocean and dump them at different sites spaced along the Atlantic, Pacific and Gulf Coast areas. However, recent studies have shown that an ocean dump can create severe upsets in the ecologies of fish and plants in the vicinity of the dump.

Little reclamation of municipal wastes is carried out since the cost of separating out the waste into different categories such as glass, paper, etc. is usually too high.

Plastics also find their uses in agriculture where, as films, they are used as much to change the environment of the growing plants and to protect the growing plants from low rainfall, cool air temperatures and cool soil temperatures. Mulch films are used as physical barriers to control weeds, evaporation and leaching.

Low soil temperatures during the spring may reduce plant growth and prolong the growing season. Mulch films can provide high soil temperatures and cause early plant development. Soil temperatures are increased significantly (over 10° F) by the use of mulch films.

Mulch films are also used to control weed growth. In a typical application, the fields may be fumigated and covered with a plastic film prior to the start of the growing season. Fumigation can be done by a special tractor that pumps liquid into the soil and also applies about 2 to 6-foot wide and generally 4-foot wide strips of film on the ground, leaving narrow rows of exposed soil between the strips of film. After about 2–4 weeks, holes are punched in the plastic film and young snap beans pepper, summer squash, eggplant, muskmelons, cucumbers, strawberries and the like are planted through the holes in the plastic. The mulch film raises the soil temperature in the root zone, decreses moisture evaporation and eliminates hoeing which can injure the root system of the plant. Another advantageous effect of the mulch film is that higher levels of carbon dioxide are provided under the film, and this carbon dioxide is released to feed the growing leaves of the plant through the holes punched in the film. Fumigation of the soil and the use of mulch films generally increase markedly the number of vegetables produced and the average weight of the vegetables, and reduces the incidence of parasitic diseases.

Mulch films can also provide improved soil structure by preventing soil compaction and soil crusting. The soil remains loose and friable and provides good aeration for the roots of the plants.

In good soil structure, an extensive root system can develop, especially in the soil close to the plant, where unmulched soil dries, crusts and root growth is limited. Mulch film contributes to a healthy root system.

Accordingly, mulch films are used to conserve soil moisture, and premature leaching of fertilizer, raise soil temperature, fumigate the soil, improve soil structure, increase beneficial microbial activity in the soil, decrease fruit rot, and aid in root development. Mulch films increase crop yields, size of individual crops, cause early maturity of the plant, and minimize the hazards of parasites, and of weather, such as drought, rainfall, and cool weather.

The serious limitation of available commercial mulch films is that mulch films do not decompose during the growing season and must be removed at the end of the crop season. If the film is not removed, the film becomes entangled in the tillage equipment, interferes with seeding, and root development.

Anti-pollution laws in some places have restricted the disposal of these mulch films to specific locations, thus requiring transporting the used mulch films to these areas.

Accordingly, disposal of presently available mulch films at the end of the growing season is costly, time consuming and contributes to the problem of soild wastes disposal.

Because of the wide variation in growing periods among various crops and for various climatic regions, it is desirable that mulch films do not disintegrate prematurely, otherwise they would no longer remain useful in conserving soil moisture, raising soil temperature, controlling weed growth, and maintaining good soil structure. Neither should the films degrade so slowly that they will interfere with harvesting, or delay soil treatment and preparation, or planting subsequent crops considering the localized and specific needs.

It is an object of the present invention to provide plastic articles which can be disposed of merely by outdoor exposure to sunlight so that they do not require incineration, burial, or dumping for disposal.

It is an object of the present invention to provide a means for disposing of a plastic product, which comprises exposing the product to a specific amount of solar radiation in a specific climate, whereby the product degrades completely and is physically consumed by the natural elements.

Another object of this invention is to provide degradable plastic products which can be manufactured by extrusion, molding, casting, spinning into fibers, forming into films, coatings or laminates, or forming into foams.

A further object is to provide plastic articles which can be manufactured in thickness ranging from a fraction of a mil to thicker than about 100 mils, which will degrade when exposed to outdoor sunlight or other sources of solar-like radiation, and which can be made clear, transluscent, or substantially opaque.

A further object of the present invention is to provide commercial products which will degrade within a predictable period of exposure to solar radiation in a known climate. For example, agricultural mulch films can be prepared according to the present invention, such that the films will degrade completely at the end of the growing season, in a known climate, for a particular crop under cultivation.

Another object of the invention is to provide agricultural mulch films which degrade to a friable material which very easily disintegrate under the action of tillage equipment, do not interfere with precision seeding, and do not require removal from the field or transportation to a disposal area.

Another object of the present invention is to provide plastic products, such as agricultural mulch films, such that the degradation rates of these products are highly predictable.

Another object of the present invention is to provide degradable agricultural mulch films, whose degradation rates are keyed to and will compensate for the normal year-to-year variations in the maturation periods of crops, particularly due to spells of extreme weather such as unseasonably hot, cool, sunny, or overcast weather.

Other and additional objects will become apparent from a consideration of this entire specification, including the examples hereinafter described, and the claims appended.

In accordance with the present invention, it has now surprisingly been discovered that degradable plastic articles with the useful properties and characteristics such as described above can be prepared by the incorporation of restricted and controlled amounts of antioxidants, stabilizers, or combinations thereof, of the type commonly used in plastics for stabilization during processing or against actinic degradation, into a polymer comprising propylene as a major polymer component. The degradation rates of the plastic articles thereby produced depend, in a controllable and predictable manner, on the method and amount of processing necessary to manufacture the article; on the amounts of the specific antioxidants, stabilizers, or combinations thereof incorporated; on the thickness of the article; and on the extent of exposure to sunlight or solar-like radiation.

In addition, it has been found that degradation is not dependent solely upon the amount of solar radiation, usually measured in Langley units, but that it is significantly dependent upon the temperature at which the article is exposed. Thus, to this end the invention provides a measure of the extent to which the Langley unit of solar radiation exposure must be corrected for various or varying temperatures of exposure. In addition, the extent of exposure can be predicted with sufficient accuracy for the uses described herein, by means of readily available statistical meterological data which have been recorded for various geographical locations throughout the world.

The method is described in U.S. patent application Ser. No. 93,393 filed Nov. 27, 1970, now pending, the disclosure of which is incorporated herein by reference.

Unstabilized propylene polymers degrade quickly and their thermal history during conversion from resin to film or container results in even further degradation. By the invention, however, incorporation of stabilizers, e.g., about 0.005 to 20% by weight and preferably 0.01 to 5% by weight, serves to increase the useful life span of the article but yet to leave it degradable. Moreover, the rate of degradation is smoothed out and rendered predictable so that articles can be fabricated which will controllably degrade in about 1 ½ months, 2 months, 6 months, etc.

The plastic materials thus prepared are stable for relatively long or indefinite periods of time during indoor use or storage, such as in a warehouse, on a store shelf, or in the home. During such indoor storage or use, products prepared according to the present invention will not suffer any appreciable losses in the properties which are necessary or desirable for their intended applications; for example, tensile strength, flexibility, elongation, chemical resistance, impermeability to moisture, and the like. Nevertheless, when such articles are exposed to outdoor solar radiation, after a period of time they will begin to degrade, as evidenced by a progressive decrease in tensile strength and elongation at break, until they reach a stage where they can be disintegrated readily by natural elements such as wind, rain, or microorganisms, and thus return to the biological cycle. That is to say, the products prepared according to the present invention degrade in a controllable manner. For example, a mulch film may be prepared according to the present invention for use with a corn crop which would normally be harvested after about 8 weeks of planting in a particular geographic area, if average weather conditions, i.e., the intensity of solar radiation and the temperatures, were to prevail. However, due to unseasonably cool weather one particular year, the crop is actually harvested about 10 weeks after planting. Then the mulch films of the present invention will degrade approximately 2 weeks more slowly so as to compensate for the stretch of cool weather, this resulting from the fact that the same factors which delay crop maturation will delay the film degradation.

STABILIZERS

In the practice of the present invention, it is necessary to incorporate one or more stabilizers into the plastic. A stabilizer is defined as a material that opposes oxidation or inhibits reactions promoted by oxygen or peroxides. Such stabilizers or antioxidants are used to protect the polymer against deterioration during processing of the polymer, storage of the polymer and during outdoor weathering of the polymer. Some types of antioxidant, are effective in preventing deterioration of the polymer during processing but are not markedly effective in preventing actinic deterioration during outdoor weathering, whereas other types of antioxidants also known as ultraviolet stabilizers minimize actinic breakdown of the polymer during outdoor weathering but are not effective in preventing deterioration during fabrication of the polymer.

Several different classes of antioxidants are known, and we have found members of each class to be useful in the practice of the present invention. Known classes of antioxidants include alkylated phenols and bisphenols, alkylidene bis-, tris-, and polyphenols, thio- and dithio-, bis-, tris-, and polyalkylated phenols, phenol condensation products, amines, organic phosphates and phosphites, dithiocarbamates, thiazyl derivatives, thiuram disulfides, thiodipropionates, small particle-size low-pH carbon black, and benzophenones. Examples of representative individual antioxidants from some of the different classes are as follows:

1. thiodialkanoic acid esters of the following formula:

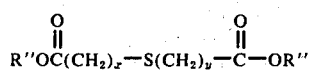

wherein R" is an alkyl group, having about 4 to 20 carbon atoms, a cycloalkyl group, a hydroxy lower alkyl group or a polyalkylene oxide group and $x$ or $y$ is an integer from 1 to about 3. Diesters include butyl, amyl, hexyl, heptyl, octyl, nonyl, dodecyl, tridecyl, myristyl, pentadecyl, cetyl, heptadecyl, stearyl, lauryl, and eicosyl esters of 3,3'-thiodipropionic acid, thiodiacetate, thiodibutyrate and the like.

Specific compounds are:
Diheptylthiodipropionate
Dioctylthiodipropionate
Dimyristylthiodipropionate
Dilaurylthiodipropionate
Distearylthiodipropionate
Di-n-butylthiodipropionate
Diallylthiodipropionate
Bis(2-hydroxyethyl)thiodipropionate
Dibutyl 4,4'-thiodibutyrate
Dioctyl 4,4'-thiodibutyrate
Dilauryl 4,4'-thiodibutyrate
Dipentadecyl 4,4'-thiodibutyrate
Dioctadecyl 4,4'-thiodibutyrate
Didecosanyl 4,4'-thiodibutyrate 2. Organo-phosphates and organo-phosphites represented by the following formulas:

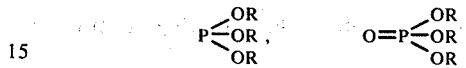

in which R is an alkyl or an aryl group, these groups being the same or different. Typical of such compounds are diphenylt-butyl phosphite, diphenyl heptyl phosphite, phenyl dioctyl phosphite, phenyl didecyl phosphite, diphenyl octyl phosphite, and the like; and diphenyl butyl phosphate, diphenyl amyl phosphate, phenyl dihexyl phosphate, diphenyl heptyl phosphate, phenyl dioctyl phosphate, diphenyl decyl phosphate, triphenyl phosphite, tributyl phosphite, trioctyl phosphite, triphenyl phosphate, triamyl phosphate, tridecyl phosphate, triphenyl phosphite, triortho-tolyl phosphite, trixenyl phosphite, tri(paraphenoxy phenyl)-phosphite, tri(para-chloro phenyl) phosphite, tri(ortho-octyl phenyl)phosphite, tri(nonylated phenyl)-phosphite, tri(para-undecyl phenyl) phosphite, para-nonyl phenyl di(para-octyl phenyl)phosphite, mono-(ortho-secondary amyl phenyl)phosphite, mono(nonyl-phenyl) phosphite.

3. Alkylene-bis-alkyl substituted cresols of the general formula:

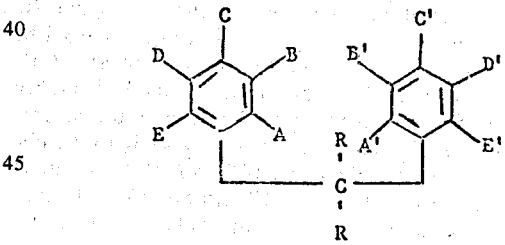

wherein one of the groups A, B, C, D and E is a hydroxyl group, two are hydrogen, one is a methyl and another is an alkyl group containing 1 to 10 carbon atoms, A', B', C', D' and E' are selected in the same manner, and R and R' are hydrogen or alkyl groups with not more than 9 carbon atoms in the sum of the R and R' groups. Typical examples are:
4,4'-methylene-bis(2,5-xylenol)
4,4'-ethylidene-bis-(6-ethyl-m-cresol)
4,4'-butylidene-bis-(6-t-butyl-m-cresol)
4,4'-decylidene-bis-(6-methyl-m-cresol)
4,4'-methylene-bis-(2-amyl-m-cresol)
4,4'-propylidene-bis-(5-hexyl-m-cresol)
3,3'-decylidene-bis-(5-ethyl-p-cresol)
2,2'-butylidene-bis-(3-n-hexyl-p-cresol)
4,4'-(2-butylidene)-bis-(6-t-butyl-m-cresol)
3,3'-4(decylidene)-bis-(5-ethyl-p-cresol)
(2,5-dimethyl-4-hydroxyphenyl) (2-hydroxy-3,5-dimethylphenyl) methane (2-methyl-4-hydroxy-5-ethylphenyl) (2-ethyl-3-hydroxy-5-methylphenyl) methane
(3-methyl-5-hydroxy-6-t-butylphenyl) (2-hydroxy-4-methyl-5-decylphenyl)-n-butyl methane
(2-hydroxy-4-ethyl-5-methylphenyl) (2-decyl-3-hydroxy-4-methylphenyl)butylamyl methane
(3-ethyl-4-methyl-5-hydroxyphenyl)-(2,3-dimethyl-3-hydroxy-phenyl)nonyl methane
(3-methyl-2-hydroxy-6-ethylphenyl)-(2-isopropyl-3-hydroxy-5-methyl-phenyl)cyclohexyl methane
(2-methyl-4-hydroxy-5-methylphenyl) (2-hydroxy-3-methyl-5-ethylphenyl)dicyclohexyl methane; and the like.

4. Substituted phenols of the following general formulas:

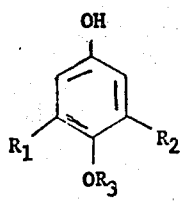 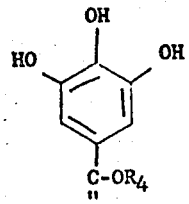

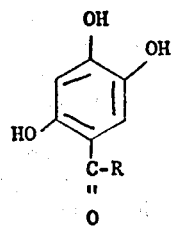 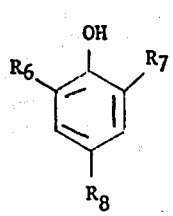

In the phenol formulas $R_3$, $R_4$ and $R_5$ are alkyl radicals desirably having 1 to about 18 carbon atoms and preferably 1 to about 12 carbon atoms. $R_1$, $R_2$ and $R_8$ are hydrogen atoms, alkyl radicals desirably having 1 to about 18 carbon atoms and preferably 1 to about 12 carbon atoms or cyclic hydrocarbon radicals desirably having 6 carbon atoms in the cyclic nucleus and preferably 1-alkyl-cyclohexyl radicals or 1-alkylbenzyl radicals with the alkyl radical having desirably 1 to about 18 and preferably 1 to about 12 carbon atoms. $R_6$ and $R_7$ are hydrogen atoms, alkyl radicals having generally 1 to about 40 carbon atoms, including 1 to about 18 carbon atoms and preferably 13 to about 18 carbon atoms or cyclic hydrocarbon radicals desirably having 6 carbon atoms in the cyclic nucleus and preferably 1-alkyl cyclohexyl radicals or 1-alkylbenzyl radicals with the alkyl radical having desirably 1 to about 18 and preferably 1 to about 12 carbon atoms. At least one of $R_1$ and $R_2$ is other than a hydrogen atom and at least two of $R_6$, $R_7$ and $R_8$ are other than hydrogen atoms. The substituent $R_2$ and at least one of $R_6$ and $R_7$ are preferably alkyl radicals, 1-methyl-benzyl radicals or 1-methylcyclohexyl radicals.

Typical substituted phenols are:
2-tert-butyl-4-methoxyphenol
3-tert-butyl-4-methoxyphenol
3-tert-octyl-4-methoxyphenol
2-methyl-4-methoxyphenol
2-stearyl-4-n-butoxyphenol
3-t-butyl-4-stearyloxyphenol
3-lauryl-4-ethoxyphenol
2,5-di-t-butyl-4-methoxyphenol
2-methyl-4-methoxyphenol
2-(1-methycyclohexyl)-4-methoxyphenol
2-t-butyl-4-dodecyloxyphenol
2-(1-methylbenzyl)-4-methoxyphenol
2-t-octyl-4-methoxyphenol
methyl gallate
n-propyl gallate
n-butyl gallate
lauryl gallate
myristyl gallate
stearyl gallate
2,4,5-trihydroxyacetophenone
2,4,5-trihydroxy-n-butyrophenone
2,4,5-trihydroxystearophenone
2,6-ditert-butyl-4-methylphenol
2,6-ditert-octyl-4-methylphenol
2,6-ditert-butyl-4-stearylphenol
2-methyl-4-methyl-6-tert-butylphenol
2,6-distearyl-4-methylphenol
2,6-dilauryl-4-methylphenol
2,6-di(n-octyl)-4-methylphenol
2,6-di(n-hexadecyl)-4-methylphenol
2,6-di(1-methylundecyl)-4-methylphenol
2,6-di(1-methylheptadecyl)-4-methylphenol
2,6-di(trimethylhexyl)-4-methylphenol
2,6-di(1,1,3,3-tetramethyloctyl)-4-methylphenol
2-n-dodecyl-6-tert.butyl-4-methylphenol
2-n-dodecyl-6-(1-methylundecyl)-4-methylphenol
2-n-dodecyl-6-(1,1,3,3-tetramethyloctyl)-4-methylphenol
2-n-dodecyl-6-n-octadecyl-4-methylphenol
2-n-dodecyl-6-n-octyl-4-methylphenol
2-methyl-6-n-octadecyl-4-methylphenol
2-n-dodecyl-6-(1-methylheptadecyl)-4-methylphenol
2,6-di(1-methylbenzyl)-4-methylphenol
2,6-di(1-methylcyclohexyl)-4-methylphenol
2,6-(1-methylcyclohexyl)-4-methylphenol
2-(1-methylbenzyl)-4-methylphenol
and related substituted phenols.

5. Alkylene bisphenols of the general formulas:

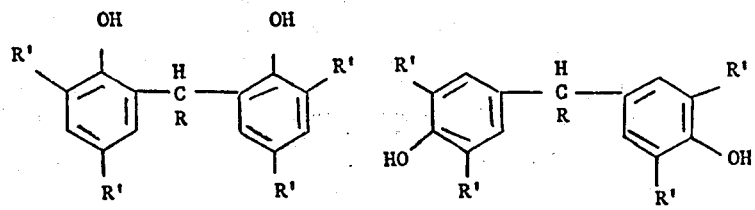

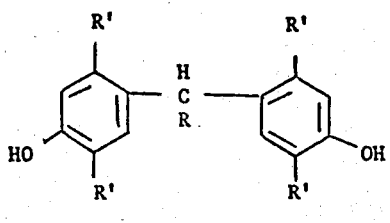

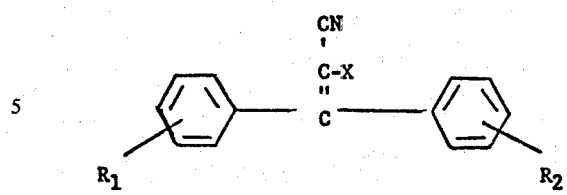

wherein R is methyl, ethyl or n-propyl and R' is an alkyl group. Examples of alkylene bisphenols are:
4,4'-butylidene bis(3-methyl-6-t-butyl phenol)
2,2-butylidene bis (4,6-dimethyl phenol)
2,2'-butylidene bis(4-methyl-6-t-butyl phenol)
2,2'-butylidene bis(4-t-butyl-6-methyl phenol)
2,2'-ethylidene bis(4-methyl-6-t-butylphenol)
2,2'-methylene bis(4,6-dimethyl phenol)
2,2'-methylene bis(4-methyl-6-t-butyl phenol)
2,2'-methylene bis(4-ethyl-6-t-butyl phenol)
4,4'-methylene bis(2,6-di-t-butyl phenol)
4,4'-methylene bis(2-methyl-6-t-butyl phenol)
4,4'-methylene bis(2,6-dimethyl phenol)
2,2'-methylene bis(4-t-butyl-6-phenyl phenol)
2,2'-dihydroxy-3,3',5,5'-tetramethylstilbene
2,2'-isopropylidene bis(4-methyl-6-t-butyl phenol)
methylene bis (beta-naphthol)
1,5-dihydroxy naphthalene
2,2'-ethylene bis (4-methyl-6-propyl phenol)
4,4'-methylene bis(2-propyl-6-t-butyl phenol)
4,4'-ethylene bis (2-methyl-6-propyl phenol)
2,2'-methylene bis(5-methyl-6-t-butyl phenol)
4,4'-butylidene bis(6-t-butyl-3-methyl phenol)

6. Alkylene trisphenols of the general formula:

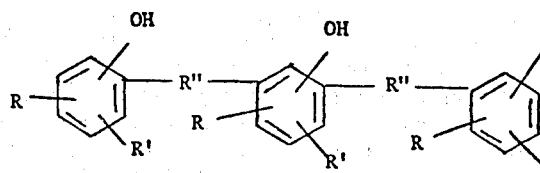

wherein R and R' are selected from the group consisting of hydrogen and lower alkyl groups (e.g., having up to 5 carbon atoms) and R" is a lower alkylene group (e.g., having up to 5 carbon atoms). R and R', for example, may be hydrogen, methyl, ethyl, propyl, isopropyl, or tertiary butyl and R" may be methylene, ethylene, propylene, ethylidene, butylidene. In one class R" is an alkylene group having two bonds on the same carbon atom (alkylidene group) i.e., a methylene or alkyl-substituted methyl group.

Typical examples of trisphenols are:
2,6-bis (2'-hydroxy-3'-t-butyl-5'-methyl benzyl)-4-methyl phenol
2,6-bis (2'-hydroxy-3'-t-ethyl-5'-butyl benzyl)-4-methyl phenol
2,6-bis(2'-hydroxy-3'-t-butyl-5'-propyl benzyl)-4-methyl phenol 7. Antioxidants useful as light stabilizers are cinnamonitriles having the formula:

wherein $R_1$ and $R_2$ are groups selected from the class consisting of alkyl groups of 1–4 carbon atoms, alkoxy groups of 1–12 carbon atoms, cyclohexyl, hydrogen and chlorine and X is a group selected from the class consisting of cyano, carbo-alkoxy groups of 1 to 4 carbon atoms, carboxamide, carboxamides substituted with at least one alkyl group of 1 to 4 carbon atoms and carboxamides substituted with a phenyl group. For example:
alpha-carbomethoxy, beta-phenyl cinnamonitrile;
alpha-carboethoxy, beta-phenyl cinnamonitrile.

8. Phenyl salicylates having the formula:

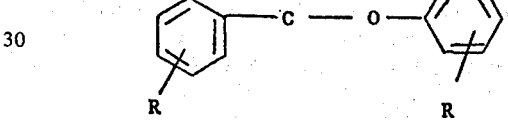

wherein each R is independently hydrogen or an alkyl radical having 1–22 carbon atoms. Examples are:
phenyl salicylate
p-tert-butylphenylsalicylate
octylphenylsalicylate
(1,1,3,3-tetramethylbutyl)phenylsalicylate
nonylphenylsalicylate
dodecylphenylsalicylate
octadecylphenylsalicylate
(1-methylheptadecyl)phenylsalicylate
t-butylphenyl 5-t-butylsalicylate
t-octaphenyl-5-t-butylsalicylate
dodecylphenyl 5-t-butylsalicylate
octadecylphenyl-5-t-butylsalicylate
octylphenyl 5-t-octylsalicylate
octylphenyl 5-dodecylsalicylate
octadecylphenyl 5-t-octylsalicylate
octadecylhexyl 5-octadecylsalicylate
(n-methylheptadecyl)phenyl 5-(1-methylheptadecyl)-salicylate
o,o'-dimethylphenylsalicylate
o,o'-dimethylphenyl 5-t-butylsalicylate
o,p-dimethylphenyl 5-t-butylsalicylate
o,o'-bis(octadecyl) phenylsalicylate
o,p-bis(octadecyl) phenylsalicylate
2,2'-dihydroxy-4,4'-dimethoxybenzophenone
2-hydroxy-4-methoxy-4'-chlorobenzophenone
2,2'-dihydroxy-4-methoxybenzophenone
2-hydroxy-4-methoxybenzophenone
2,2'-dihydroxy-4-methoxy-ethoxy benzophenone 9. Primary polyamines, such as p,p'-diaminodiphenylmethane (formaldehyde aniline), diarylamines, such as N-phenyl-α-naphthylamine, bis-diarylamines such as N,N'-diphenyl-p-phenylene-diamine, mixtures containing diarylamines, modified bisdiarylamines such as N-cyclohexyl-N'-phenyl p-phenylenediamine, alkylated diarylamines, e.g., monooctyl and dioctyldiphenylamine mixtures, mixtures containing alkylated diarylamines, ketone-diarylamine condensation products such as diphenylamine-acetone condensation products, dihydroquinolines, such as 1,2-dihydro-2,2,4-trimethyl-6-phenylquinoline, mixtures of dihydroquinolines and diarylamines, aldehyde-amine condensation products, such as aldol-α-naphthylamine condensation products, alkylarylamines such as N,N'-diphenyl-ethylenediamine, and aldehyde imines.

The types of antioxidants listed above are generally intended to protect against thermal degradation during processing, but are also useful in retarding actinic degradation of polymers. Antioxidants usually designated as ultraviolet stabilizers, i.e., specifically useful in retarding actinic degradation of polymers, include nickel organic compounds such as nickel bisoctyl phenyl sulfide, benzotriazoles such as substituted hydroxyphenyl benzotriazole and benzophenones such as 2-hydroxy-4-n-octoxybenzophenone, benzylidene malonates such as p-methoxybenzylidene malonic acid, salicylates such as p-octylphenyl salicylate, substituted acrylonitriles such as ethyl-2-cyano-3,3-diphenyl acrylate, monobenzoates such as resorcinol monobenzoate and other compounds such as beta-benzoyloxy-2'-hydroxy-chalcone.

Inorganic pigments may also be used to retard actinic degradation of polymers. The inorganic pigments include titanium dioxide, zinc oxide, silica, aluminum silicate and acidic carbon black.

The antioxidant system used within the scope of the present invention can vary within very wide limits and will depend upon the stabilizing strength of the antioxidant system, the heat history of the polymer, the amount of solar radiation needed to degrade the film, and the ambient temperatures to which the film will be exposed and the types and amounts of other additives used. The other possible additives include filler, inorganic pigments, and other polymers, and for agricultural applications can include fertilizer, herbicides, insecticides and fungicides.

By "antioxidant system" we mean the specific antioxidants or stabilizers and their amounts incorporated in the polymer. The antioxidant system may be added to the polymer by dry blending, by dispersion, by solution in a suitable solvent, or by dissoving the polymer and antioxidant in a suitable solvent.

POLYMER

The polymer used in this invention may be homopolymer of propylene, or it may be a co- or higher polymer of predominantly propylene with other copolymerizable olefinically unsaturated monomers, such as ethylene, butylene, methyl-pentene, $C_6$-$C_{20}$ alpha olefins, styrene, butadiene, isoprene, and the like. Further mixtures of propylene homopolymer with homo- or copolymers of other monomers are suitable, or graft or block copolymers of these monomers may be used. Still further, polyolefins may be blended in quantities up to 20% with polypropylene for specific applications. Whether present as a blend or copolymer, the content of propylene should be at least about 50% by weight of total monomer, advantageously at least about 60% and preferably at least about 75%.

The polymer of propylene may have a molecular weight of about 20,000 to 3,000,000; preferably about 50,000 to 1,000,000. The polymer preferably is over 50% isotactic and preferably over 70% isotactic as measured by diethyl ether extraction. The polymer preferably has a melt index between 0.05 and about 60, more preferably between about 0.1 and 20 (ASTM D-1238-65T; 190° C, 2160 g).

THERMAL HISTORY

The thermal history of the article will influence the amount of solar radiation required to degrade the film. The thermal histroy of the article is determined by the processing temperatures during preparation of the rod and pellets and during forming of the article, by the degree of orientation, by the number of times the polymer has been extruded forming the article. The specific thermal conditions of forming polymer rods, pellets and, ultimately, extrusions or injections can be tailored so that, with allowance made for the special additives, the final products will have the desired characteristics of degradation.

Thus, while polypropylene has heretofore been proposed as an agricultural mulch film it has not been identified as to constitution or thermal history. Moreover, most polypropylene films will not be suited for the instant purposes in that their stability will be too great, i.e. they will not degrade, even if the polymer employed were identical with that of the present invention. This is due to the following reason: whereas, polyethylene is inherently quite stable and even essentially unstabilized polyethylene has a very long outdoor stability so that it is not useful as a degradable agricultural mulch film, polypropylene because of its thermal properties and uncontrollable instability has been loaded heavily with stabilizer and antioxidant to form film. This is so well known that even when descriptions are given as to working "polypropylen" for example, no reference is given to stabilizers since everyone skilled in the art is aware that a relatively high proportion of stabilizer must necessarily be present, especially for producing shaped objects by processes which require much heat. For this reason, many commercial polypropylene resins are compounded with sufficient stabilizer, partially for carrying the polymer from raw resin through the melting, extrusion of strands and cutting into pellet form which is commercial; also, to make subsequent processing possible without uncontrolled degradation, the user generally adds more stabilizers along with pigments prior to extrusion, and also to obtain sufficient shelf and outside stability so that the polypropylene object will not embrittle during a reasonable storage and usage period.

Thus, the polypropylene object would normally be compounded with sufficient stabilizer to provide products of very high stability, i.e., over 100,000 TALU, and frequently much higher. Thus, some of these films at the low end of this TALU range might be useful as agricultural mulch films if the temperature is extremely high and there is unobstructed sunlight for long periods of time, i.e., in the tropics. In other environments, such as northeastern part of United States, the degradation would be too slow.

Although high levels of stabilizer are undoubtedly preferred for shaping polypropylene objects in usual fashion, experimentation surprisingly indicated shaping was possible without the normal amounts of stabilizer needed for most standard commercial polypropylene objects, and yet the product would not degrade uncontrollably during shaping or in later use.

Consequently, in accordance with one aspect of our invention it is possible by proper control of processing conditions to achieve the desired levels of relatively rapid controlled degradability of polypropylene by using little if any stabilizer during the polypropylene shaping, e.g., less than 1% generally less than 0.5% and even less then 0.3% under ideal extrusion conditions, i.e., minimum degradation. In accordance with another aspect of this invention, as noted hereinabove, the requisite degradability can be achieved by tailoring the thermal history of the polymer even at higher, i.e., normal, levels of stabilizer. Thus, where stabilizers are normally present in commercial polypropylene resin, the thermal history will be so tailored to the particular stabilizer and its content that, as a result of the interaction of these parameters, the product will have the desired short term stability, i.e., less than about 70,000 TALU.

TEST PROCEDURE FOR MEASUREMENT OF EXPOSURE AND DEGRADATION

As part of the practice of the present invention, we devised test procedures and a method of calculation which permits the degradation rates of the degradable plastic products to be predicted. The test procedures and the method are described in U.S. patent application Ser. No. 93,393, supra.

Results of polypropylene film tests are summarized in Table II.

The invention is further described in the following illustrative examples where all parts are by weight unless otherwise expressed.

EXAMPLE 1

About 400 grams of unstabilized polypropylene resin with a molecular weight of about 200,000 and a melt index of 0.5 were mixed using a Waring Blendor with 0.08 gram tris(mixed mono and dinonyl phenyl) phosphite and 0.8 gram dilaurylthiodipropionate in 900 cc of acetone. The slurry was transferred to a 4-liter beaker and the acetone was allowed to evaporate off overnight at room temperature. The polymer was dried in a vacuum oven at about 30° C. The stabilized polypropylene was extruded in a 1-inch Killion extruder at a temperature of about 430° to 450° F through a rod die and pulled through a water trough by a chill roll to obtain a rod of about ¼-inch diameter. The rod was cut into lengths of about 12 inches and ground in a Dreher Grinder to obtain pellets. The stabilized polypropylene pellets were extruded through a 6-inch film die in a 1-inch Killion extruder at an extrusion temperature of about 430° F and an extruder speed of 20 rpm. The film extrudate was dropped onto a chill roll which was cooled by prechilled ethylene glycol to give a chill roll temperature of about 45° F. Polypropylene film having a thickness of about 1.8 mils and a width of about 4 inches was obtained.

Thirty 0.5 × 5-inch strips of film were cut from the extruded film by a die cutter. The strips were exposed outside on August 4 according to the test method described in U.S. patent application Ser. No. 93,393, filed Nov. 27, 1970.

The amount of solar radiation to which the film strips was exposed was measured daily by a 7-day Belfort Pyrheliograph. The total radiation in Langley units, gram calories per square centimeter, was measured from a weekly chart by integration of the area under the inked record using a polar planimeter.

During the outdoor exposure period, the condition of the film strips was noted with respect to the number of broken and/or split strips. After different periods of exposure, five strips of film were removed from the frame without disassembling the frame. These times of exposure were 2,4,5,6 and 7 weeks. The tensile strength and elongation of the films were measured by an Instron machine, holding the film with rubber coated grips.

The films were exposed to 6,140 TALU (temperature adjusted Langley units) in 2 weeks, to 12,800 TALU in 4 weeks, to 13,900 TALU in 5 weeks, to 16,100 TALU in 6 weeks and to 18,200 TALU in 7 weeks. After 6 weeks of exposure, the polypropylene strips were quite brittle as indicated by an average tensile strength of 1,600 psi and elongation values of 10,1,4,75 and 38% on five strips. After 7 weeks of exposure to 18,300 TALU, the polypropylene had degraded as shown by an average tensile strength of 1,200 psi and an average elongation value of 13% on five strips and by the fact that four other strips had broken away from the frame. The unexposed film had a tensile strength of 3,600 psi and an elongation of over 740%.

EXAMPLE 2

Polypropylene film stabilized with about 0.05% of ditertiary butyl-para-cresol was cut into 0.5 × 5-inch strips by a die cutter. Thirty strips were exposed outside on August 4 according to the procedure given in Example 1. The unexposed strips had a tensile strength of 3,200 psi and an elongation of over 980%. After 4 weeks of exposure to (13,600 Langley units) 12,800 TALU, the properties had dropped to a tensile of 2,600 psi and 66% elongation. After 5 weeks of exposure to (15,200 Langley units) 13,900 TALU, the film was quite brittle and the tensile properties degraded to 1200 psi and an elongation of 12%. After 6 weeks of exposure to (18,300 Langley units) 16,100 TALU, the tensile strength was 1200 psi and the elongation was 3%.

EXAMPLE 3

Essentially unstabilized polyethylene, containing only 0.001% of butylated hydroxy toluene was prepared into approximately 2-mil film by the procedure described in Example 1 and 30 film strips were tested for outdoor stability by the procedure given in Example 1. The test was started on August 4. The unexposed film had a tensile strength of 1600 psi and an elongation of 280%. After 4 weeks of exposure to 12,800 TALU, the film strips had a tensile strength of 1400 psi and an elongation of 230%. After 6 weeks of exposure to 16,000 TALU, polyethylene had a tensile strength of 1400 psi and an elongation of 350%. The film was still quite tough after 18 weeks of exposure to 26,700 TALU, as judged by a tensile strength of 1400 psi and an elongation of 210%.

Polyethylene film stabilized with 0.02% tris(mixed mono-and dinonyl phenyl)phosphite and 0.2% dilaurylthiodipropionate and made by the procedure given in Example 1, also was minimally affected during this period of outside weathering exposure. The unexposed film had a tensile strength of 1600 psi and an elongation of 350%. After 18 weeks of exposure of 26,700 TALU, the film was quite tough and had a tensile strength of 1600 psi and an elongation of 280%.

EXAMPLE 4

Polypropylene resin of 0.5 melt index was stabilized with 0.2% of tris(mixed mono-and dinonyl phenyl)-phosphite and 0.2% of dilaurylthiodipropionate according to the procedure given in Example 1. The stabilized resin was converted into approximately 2-mil film and tested for outdoor stability by the method given in Example 1. The test was started July 7, using 60 film strips. The unexposed film had a tensile strength of over 3400 psi and an elongation of over 560%. After 8 weeks of exposure to 22,200 TALU, the film strip had a tensile strength of 2600 psi and an elongation of 306%. After 12 weeks of exposure to 29,300 TALU, 11 strips had broken and were not available for testing purposes. Accordingly, the polypropylene film had degraded during 12 week exposure.

EXAMPLE 5

Polypropylene resin of 5.0 melt index was stabilized with 0.2% of tris(mixed mono- and dinonyl phenyl)-phosphite and 0.2% of dilaurylthiodipropionate according to the procedure given in Example 1. The stabilized resin was converted into approximately 2-mil film and tested for outdoor stability by the method given in Example 1. The test was started July 7, using 40 film strips. The unexposed film had a tensile strength of 6400 psi and an elongation of over 370%. After an exposure of 8 weeks to 22,200 TALU, the film had a tensile strength of 3800 psi and an elongation of 48%. After an exposure of 9 weeks to 23,300 TALU, three strips were tested; one had a tensile strength of 3200 psi and an elongation of 270%; the other two strips had degraded as judged by tensile strengths of 800 and 1200 psi and elongation values of 10%. After an exposure of 10 weeks to 25,500 TALU, polypropylene film had degraded since only one strip remained and five strips had broken away from the frame.

EXAMPLE 6

Polypropylene resin of 0.5 melt index was stabilized with 0.2% of tris(mixed mono- and dinonyl phenyl)-phosphite, 0.2% of dilaurylthiodipropionate and 0.1% of 2-hydroxy-4-n-octoxy-benzophenone according to the procedure given in Example 1. The stabilized resin was converted into approximately 2-mil film and tested for outdoor stability by the method given in Example 1. The test was started July 7, using 40 film strips, the unexposed film had a tensile strength of over 370%. After an exposure of 9 weeks to 23,300 TALU, the polypropylene had a tensile strength of 3200 psi and an elongation of 790%. After an exposure of 12 weeks to 29,300 TALU, the film had a tensile strength of 2400 psi and an elongation of 200%. After an exposure of 18 weeks to 34,100 TALU, the tensile properties had decreased further to a tensile strength of 2000 psi and an average elongation of 131%.

EXAMPLE 7

Polypropylene film described in Example 2 was cut into 0.5 × 5-inch strips by a die cutter. Nineteen strips were exposed outside on April 13 according to the procedure given in Example 1. After 5 weeks of exposure to 6,840 TALU (12,620 Langley units), the film had a tensile strength of 2420 psi and an elongation of 181%. After 52 weeks of exposure to 12,100 TALU (20,800 Langley units), the film had degraded as judged by a tensile strength of 1740 psi and an average elongation value of 5%.

Thus, polypropylene film (see Example 2) exposed on August 4, degraded to an elongation of 12% in 35 days of exposure to 13,900 TALU or 15,200 Langley units. However, 52 days corresponding to 12,000 temperature-adjusted Langley units were required to degrade the same polypropylene film exposed beginning April 13. Exposure in uncorrected Langley units were 15,200 and 20,800, respectively, as indicated in Table I.

TABLE I

| | EXAMPLE 7 | | |
| | Exposure to About 10% Elongation | | |
| Starting Date of Test | Langley Units | Temperature-Adjusted Langley Units | Exposure Period To About 10% Elongation, Days |
| --- | --- | --- | --- |
| April 13 | 20,800 | 12,000 | 52 |
| August 4 | 15,200 | 12,900 | 35 |

To predict the degradation period necessary for a specific degradable plastic article to take place at a particular geographic location and to be exposed starting at a given date, it is first necessary to establish the number of TALU for degradation in an exposure test conducted at an convenient location and starting at any convenient time of year using the test method outlined in U.S. patent application Ser. No. 93,393. Then use is made of statistical meteorological data published by various weather bureaus to calculate the TALU value for specific locations for specific times of the year.

EXAMPLE 8

Unstabilized polypropylene resin (500 grams) was stabilized with 0.2% tris(mixed mono- and dinonyl phenyl)phosphite and 0.2% dilaurylthiodipropionate by the method given in Example 1. The stabilized polypropylene resin was extruded in a 1-inch Killion extruder at a temperature of about 480° F through a rod die and pulled through a water trough by a chill roll to obtain rod of about ¼-inch diameter. The rod was cut into lengths of about 12 inches and ground in a Dreher Grinder to obtain pellets. The stabilized polypropylene pellets were extruded in a 1-inch Killion extruder through a 6-inch film die at an extrusion temperature of 480° to 520° F and an extruder speed of 50 rpm. The film extrudate was dropped onto a chill roll which was cooled with water to give chill roll temperatures of about 80° to 120° F. Polypropylene film having a width of about 4 inches and a thickness of about 2 mils was prepared. Sixty 0.5 × 5-inch strips of film were cut from the extruded film by a die cutter. The strips were exposed outside on May 28 according to the test method described in U.S. patent application Ser. No. 93,393, filed Nov. 27, 1970.

The unexposed film had a tensile strength of 2600 psi and an elongation of 250%. After 2 weeks of exposure to 6,000 TALU, the tensile properties of the film dropped to a tensile strength of 1600 psi and an elongation of 85%. After 3 weeks of exposure to 8,760 TALU, the film had degraded as shown by a tensile strength of only 1400 psi and an elongation of about 10%. Degradation was much faster than in Example 4 using the same antioxidant system, but in which the polypropylene was prepared under relatively milder conditions of extrusion.

an exposure of 6 weeks to 16,300 TALU, the film had a tensile strength of 2200 psi and an elongation of 122%. The film properties continued to drop and after 8 weeks of exposure to 21,500 TALU, the film had a tensile strength of 1800 psi and an elongation of 40%. The film degraded to a tensile strength of less than 1800 psi and an elongation of less than 10%, after an exposure of about 24,000 TALU, as judged by the fact that the remaining strips on the frame were broken or split and could not be tested.

TABLE II

DEGRADABILITIES OF POLYPROPYLENE FILMS CONTAINING VARIOUS ANTIOXIDANT SYSTEMS

| Example No. | Melt Index | Resin Processing Conditions | | | Stabilizer % | | | | TALU Degradation Temp. Adj. Lang Units g.cal/cm² × 10⁻³ |
| --- | --- | --- | --- | --- | --- | --- | --- | --- | --- |
| | | Temp. | Extruder Speed | Degree of Orientation | (1) | (2) | (3) | (4) | |
| 1 | 0.5 | Low | Low | Low | 0.2 | 0.2 | | | 18.3 |
| 2 | 0.5 | Low | Low | Low | | | 0.5 | | 13.9 |
| 4 | 0.5 | Low | Low | Low | 0.2 | 0.2 | | | 29.3 |
| 5 | 5 | Low | Low | Low | 0.2 | 0.2 | | | 24 |
| 6 | 0.5 | Low | Low | Low | 0.2 | 0.2 | | 0.1 | 34.1 |
| 8 | 0.5 | High | High | High | 0.2 | 0.2 | | | 8.8 |
| 9 | 0.5 | High | High | High | 0.2 | 0.2 | | 0.1 | 21.5 |
| 10 | 0.5 | High | High | High | 0.2 | 0.2 | | 0.3 | 24.0 |

(1) tri(mixed mono- and dinonyl phenyl)phosphite
(2) dilaurylthiodipropionate
(3) di-tertiary-butyl-para-cresol
(4) 2(3',5'-ditertiary-butyl-2-hydroxyphenyl-5-chlorobenzotriazole

EXAMPLE 9

Unstabilized polypropylene resin (500 grams) was stabilized with 0.2% of tris(mixed mono- and dinonyl phenyl)phosphite, 0.2% of dilaurylthiodipropionate, and 0.1% of 2-hydroxy-4-n-octoxybenzophenone according to the procedure given in Example 1. The stabilizer system was identical to the system given in Example 6. The stabilized resin was converted into approximately 2-mil film by the method described in Example 8. The film was tested for outdoor weather stability by the method given in Example 1. The test was started May 28.

The unexposed film had a tensile strength of 4200 psi and an elongation of over 310%. After an exposure of 3 weeks to 8,760 TALU, the film had a tensile strength of 3400 psi and an elongation of 370%. After an exposure of 5 weeks to 13,600 TALU, the film had a tensile strength of 1800 psi and an elongation of 126%. After an exposure of 6 weeks to 16,300 TALU, the film embrittled as judged by a tensile strength of 1400 psi and an elongation of 20%, and after an exposure of 8 weeks to 21,500 TALU, the film had degraded as shown by a tensile strength of only 600 psi and an elongation of 11%.

EXAMPLE 10

Unstabilized polypropylene resin (500 grams) was stabilized with 0.2% of tris(mixed mono- and dinonyl phenyl)phosphite, 0.2% dilaurylthiodipropionate, and 0.3% of 2-hydroxy-4-n-octoxybenzophenone according to the procedure given in Example 1. The stabilized resin was converted into about 2-mil film by the procedure given in Example 8 and tested for outdoor stability on May 28, by the method given in Example 1.

The unexposed film had a tensile strength of 4400 psi and an elongation of 530%. After an exposure of 3 weeks to 8,760 TALU, the film had a tensile strength of 3800 psi and an elongation of 260%. After an exposure of 5 weeks to 13,600 TALU, the film had a tensile strength of 3200 psi and an elongation of 150%. After

EXAMPLE 11

A 4-foot wide polypropylene film of 1.5 mil thickness and stabilized with 0.05% of di-t-butyl-para-cresol was prepared by using commercial blown film equipment, slitting the film and winding the film onto a 4-foot reel. The film can be applied in early April to a field in New Jersey seeded with sweet corn and to which a weed killer had been applied. After about 6 to 8 weeks the film is punctured, plants are pulled through and the sweet corn picked in the latter part of June and early July. The plastic degrades by early July. The clear mulch film provides 8–10 days earlier maturity than unmulched corn.

EXAMPLE 12

A 4-foot wide polypropylene film having a thickness of about 1.4 mil and stabilized with 0.2% of tri(-nonylated phenyl) phosphite and 0.2% of dilaurylthiodipropionate was prepared by using commercial blown film equipment, slitting the film and winding the film onto 4-foot reels. The film can be applied in early April to a field which has been fumigated. About 10–20 days later, young muskmelon plants can be set through the plastic. The plastic will raise the temperature in the root zone, conserve moisture and eliminate the necessity of hoeing.

The polypropylene film starts to degrade at the beginning of August and degrades completely by early September, eliminating completely the necessity of removing the film from the ground. The yield of muskmelon grown in land using the degradable film will increase by a factor of about 25% when compared to plants grown over bare ground. The yield of muskmelons using the degradable polypropylene film is equivalent to the yield obtained using nondegradable clear polyethylene and is higher than the obtained using black polyethylene film. Neither clear nor black polyethylene films degrade during this period and the polyethylene films have to be removed from the field manually.

It will be appreciated that the instant specification and examples are set forth by way of illustration and not limitation and that various modifications and changes may be made without departing from the spirit and scope of the present invention.

What is claimed is:

1. In the growing of an agricultural crop in a field in which the field is at least partially covered with a plastic film for a predetermined growth period, the improvement which comprises ascertaining, from the meteoroligical data for the geographic area in which said field is located, the amount of TALU for said predetermined growth period, and covering said field with a film having a thickness of the order of magnitude of about 1 to 2 mils and consisting essentially of about 0.01 to 5% by weight of a stabilizer and polypropylene having a molecular weight in excess of about 40,000, the thermal treatment of said polypropylene prior to the time when it is applied to said field as a film having been such as to reduce its initial stability by at least about 5,000 TALU, said film having a stability approximately that of the TALU determined but at least about 8,000 but not in excess of about 35,000 TALU, whereby the film will degrade after said predetermined growth period, the degradation being accelerated or decelerated in accordance with the acceleration or deceleration of crop growth due to climatic conditions.

2. The process of claim 1 wherein the film has a stability of at least about 10,000 TALU.

* * * * *